United States Patent [19]
Dehnert et al.

[11] 3,950,321
[45] Apr. 13, 1976

[54] DISPERSE AZO DYES OF THE 2,6-DIAMINOPYRIDINE SERIES

[75] Inventors: Johannes Dehnert; Günther Lamm, both of Ludwigshafen, Germany

[73] Assignee: BASF Aktiengesellschaft, Ludwigshafen, Rhine, Germany

[22] Filed: Oct. 18, 1973

[21] Appl. No.: 407,563

[52] U.S. Cl. ......... 260/156; 260/294.8 F; 260/294.9
[51] Int. Cl.² ........................................ C07C 107/04
[58] Field of Search ..................................... 260/156

[56] References Cited
UNITED STATES PATENTS

| | | | |
|---|---|---|---|
| 3,487,066 | 12/1969 | Ritter et al. | 260/156 |
| 3,657,214 | 4/1972 | Berrie et al. | 260/156 |

FOREIGN PATENTS OR APPLICATIONS

| | | | |
|---|---|---|---|
| 270,987 | 12/1950 | Switzerland | 260/156 |
| 1,901,711 | 4/1970 | Germany | 260/156 |
| 2,002,022 | 7/1971 | Germany | 260/156 |
| 2,062,717 | 6/1972 | Germany | 260/156 |

*Primary Examiner*—Henry R. Jiles
*Assistant Examiner*—Robert W. Ramsuer
*Attorney, Agent, or Firm*—Johnston, Keil, Thompson & Shurtleff

[57] ABSTRACT

Disperse azo dyes of the 2,6-diaminopyridine series in which one of the amine groups in the 2-position or 6-position is acylated. The dyes give brilliant yellow to blue colorations of generally high fastness properties particularly on polyesters.

2 Claims, No Drawings

DISPERSE AZO DYES OF THE 2,6-DIAMINOPYRIDINE SERIES

The invention relates to dyes of the formula (I):

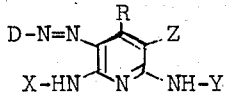

(I), in which D is the radical of a diazo component; R is hydrogen, unsubstituted or substituted alkyl of one to seven carbon atoms or unsubstituted or substituted phenyl; Z is hydrogen, carbamoyl or cyano; one of the radicals X and Y is acyl and the other hydrogen or unsubstituted or substituted alkyl, cycloalkyl, aralkyl or phenyl.

Radicals D may be derived for example from amines of the benzene, benzothiazole, benzoisothiazole, thiazole, thiadiazole, thiophene, azobenzene or anthraquinone series and bear, particularly in the benzene series, preferably a second-order substituent, i.e. for example nitro, cyano, methylsulfonyl or carbomethoxy.

The following are examples of substituents for the radical D of the diazo component:

in the benzene series: chloro, bromo, nitro, cyano, trifluoromethyl, methylsulfonyl, ethylsulfonyl, phenylsulfonyl, carbomethoxy, carbobutoxy, carbo-β-methoxyethoxy, carbo-β-hydroxyethoxy, unsubstituted, N-monosubstituted or N-disubstituted carbamoyl or sulfonamide, methyl, ethyl, methoxy and ethoxy; examples of N-substituents are: methyl, ethyl, propyl, butyl, β-hydroxyethyl, γ-hydroxyethyl, β-methoxyethyl, γ-methoxypropyl, γ-ethoxypropyl, pyrrolidide, piperidide and morpholide;

in the azobenzene series: chloro, bromo, nitro, cyano, methyl, ethyl, methoxy or ethoxy;

in the heterocyclic series: chloro, bromo, nitro, cyano, methyl, ethyl, phenyl, methoxy, ethoxy, methylmercapto, β-carbomethoxyethylmercapto, β-carbethoxyethylmercapto, carbomethoxy, carbethoxy, acetyl, methylsulfonyl and ethylsulfonyl.

Radical D may be derived specifically for example from the following amines: aniline, o-toluidine, m-toluidine, p-toluidine, o-nitroaniline, p-nitroaniline, m-nitroaniline, o-cyanoaniline, m-cyanoaniline, p-cyanoaniline, 2,4-dicyanoaniline, o-chloroaniline, m-chloroaniline, p-chloroaniline, o-bromoaniline, m-bromoaniline, p-bromoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide or β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,4-dinitrobenzene-6-carboxylic acid methyl ester or β-methoxyethyl ester, propyl, 3,5-dichloroanthranilate, β-methoxyethyl, 3,5-dibromoanthranilate, N-acetyl-p-phenylenediamine, 4-aminoacetophenone, 4-aminobenzophenone, 2-aminobenzophenone, 2-aminodiphenylsulfone, 4-aminodiphenylsulfone, the methyl, ethyl, propyl, butyl, isobutyl, β-methoxyethyl, β-ethoxyethyl, methyldiglycol, ethyldiglycol, methyltriglycol, ethyltriglycol, β-hydroxyethyl, β-acetoxyethyl, β-(β'-hydroxyethoxy)ethyl, β-hydroxypropyl, γ-hydroxypropyl, ω-hydroxybutyl, and ω-hydroxyhexyl ester of 2-aminobenzoic, 3-aminobenzoic and 4-aminobenzoic acid, the methyl, isobutyl, methyldiglycol, β-methoxyethyl, β-butoxyethyl and β-acetoxyethyl ester of 5-nitroanthranilic acid, the dimethyl, diethyl, dipropyl and dibutyl ester of 3-aminophthalic acid, 4-aminophthalic acid, 5-aminoisophthalic acid and aminoterephthalic acid, the amide, methylamide, propylamide, butylamide, isobutylamide, cyclohexylamide, β-ethylhexylamide, γ-methoxypropylamide and γ-ethoxypropylamide of 3-aminobenzoic and 4-aminobenzoic acid, the dimethylamide diethylamide, pyrrolidide, morpholide and N-methyl-N-β-hydroxyethylamide of 2-aminobenzoic, 3-aminobenzoic and 4-aminobenzoic acid, the diamide of 5-amineisophthalic acid, the bis-γ-methoxypropylamide of 5-aminoisophthalic acid, the bis-diethylamide of aminoterephthalic acid, 3-aminophthalimide, 4-aminophthalimide, the β-hydroxyethylamide and γ-hydroxypropylamide of 3-aminophthalic and 4-aminophthalic acid, the β-hydroxyethylamide of 3-amino-6-nitrophthalic acid, the dimethylamide, diethylamide, pyrrolidide and morpholide of 3-aminobenzene sulfonic and 4-aminobenzenesulfonic acid, the 2'-aminophenyl, 3'-aminophenyl and 4'-aminophenyl ester of methylsulfonic acid, the 2'-aminophenyl, 3'-amino phenyl and 4'-aminophenyl ester of ethylsulfonic acid, the 2'-aminophenyl, 3'-aminophenyl and 4'-aminophenyl ester of butylsulfonic acid, the 2'-aminophenyl, 3'-aminophenyl and 4'-aminophenyl ester of benzenesulfonic acid, 2-aminoanthraquinone, 1-amino-4-chloroanthraquinone, 3-aminodiphenyl oxide, 4-aminodiphenyl oxide, 2-aminobenzothiazole, 2-amino-6-carboxylic acid methyl ester benzothiazole, 2-amino-6-methylsulfonylbenzothiazole, 2-amino-6-cyanobenzothiazole, 2-amino-6-nitrobenzothiazole, 5,6-dichloro-2-aminobenzothiazole, 6,7-dichloro-2-aminobenzothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 2-aminothiazole, 2-amino-5-nitrothiazole, the ethyl ester of 2-amino-4-methylthiazole-5-carboxylic acid, 2-amino-4-methyl-5-acetylthiazole, 2-amino-3-cyano-4-methylthiophene-5-carboxylic ester, 2-phenyl-5-amino-1,3,4-thiadiazole, 3-methylmercapto-5-amino-1,2,4-thiadiazole, 3-β-carbomethoxyethylmercapto-5-amino-1,2,4-thiadiazole and 3-β-carbomethoxyethylmercapto-5-amino-1,2,4-thiadiazole.

Examples of suitable diazo components of the aminoazobenzene seies are: 4-aminoazobenzene, 2',3'-dimethyl-4-aminoazobenzene, 3',2-dimethyl-4-aminoazobenzene, 2,5-dimethyl-4-aminoazobene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzen, 4'-chloro-2-methyl-4-aminoazobenzene, 2,5-dimethoxy-4-aminoazobenzene, 4'-chloro-2,5-dimethoxy-4-aminoazobenzene, 4'-nitro- 2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, and 4'-hydroxy-2'-methyl-4-aminoazobenzene.

Examples of radicals R (apart from hydrogen) are: ethyl, n-propyl, isopropyl, butyl, pentyl, α-ethylpentyl, phenyl, methylphenyl and, preferably, methyl.

Examples of acyl radicals X or Y are: alkanoyl of one to ten carbon atoms which may be substituted by hydroxy, alkoxy, cyano, chloro, acetyl, phenyl or phenoxy; benzoyl which may be substituted by chloro, methyl or methoxy, and the radicals of the formulae: —SO₂N—CH₃, —CONH₂, —CO—CH=CH—C₆H₅, —COO—alkyl, —SO₂alkyl, —SO₂—aryl, —CONH—alkyl or —CONH—aryl.

Specific aexamples of acyl radicals are as follows: formyl, acetyl, propionyl, butyryl, hexanoyl, β-ethylhexanoyl, β-cyanoacetyl, β-chloracetyl, β-methoxyacetyl, β-phenoxyacetyl, β-phenylacetyl or β-acetylacetyl and the radicals of the formulae: COOCH₃, COOC₂H₅, COOC₃H₇. COOC₄H₉, SO₂CH₃, SO₂C₂H₅, SO₂C₄H₉, SO₂C₆H₅,

CONHCH₃, CONHC₄H₉ or CONHC₆H₅.

The following substituents are other examples for X and Y (in addition to hydrogen and acyl radicals): alkyl of one to six carbon atoms, alkyl substituted by hydroxy, cyano, alkoxy of one to eight carbon atoms, phenoxy, phenoxyethoxy or benzyloxy, cyclohexyl, benzyl, phenylethyl, phenylhydroxyethyl, phenylpropyl, phenylbutyl, phenyl substituted by chloro, methyl, methoxy or ethoxy, polyalkoxyalkyl, hydroxypolyalkoxyalkyl, alkanoyloxyalkyl or alkoxycarbonylalkyl.

Examples of individual radicals X and Y are: the alkyl radicals methyl, ethyl, propyl or butyl; the hydroxyalkyl radicals β-hydroxyethyl, β-hydroxypropyl, γ-hydroxypropyl, ω-hydroxyhexyl, and the radicals of the formulae —CH₂—CH₂—O—CH₂—CH₂—OH, —CH₂—CH₂—CH₂—O—CH₂—CH₂—CH₂—CH₂—OH, —(CH₂)₃—O—(CH₂)₆—OH, —(CH₂)₃—O—(CH₂)₂—O—CH₃, —(CH₂)₃—O—(CH₂)₂—O(CH₂)₂—OCH₃, —(CH₂)₃—O—(CH₂)₂—O—C₆H₅, —(CH₂)₃—O—CH₂—C₆H₅,

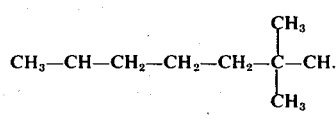

—CH₂—CH—C₆H₅,

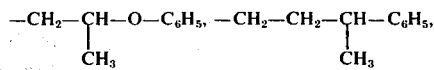

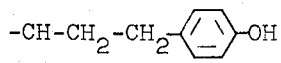

—CH₂—CH₂—OCH₃, —(CH₂)₃—O—C₂H₅, —(CH₂)₃—O—(CH₃)₂, C₆H₅, and the acyloxyalkyl radicals of the formulae: —CH₂—CH₂—O—acyl, —(CH₂)₃—O—acyl,

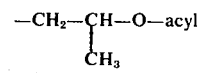

—(CH₂)₆—O—acyl, —(CH₂)₂—O—(CH₂)₂—O—acyl, —(CH₂)₃—O—(CH₂)₄—O—acyl

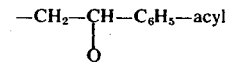

wherein acyl may be for example —COH or —COCH₃.

The dyes of the formula (I) may be prepared by reacting an amine of the formula (II): D—NH₂ (II) with a coupling component of the formula (III):

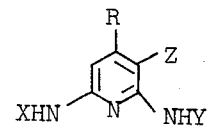

where D, R, X, Y and Z have the above meanings.

Diazotization of the amines may be carried out by a conventional method. Coupling is also carried out conventionally in an aqueous medium, with or without the addition of solvents, in a weakly to strongly acid reaction.

If dyes according to the invention having the formula (I) contain an ester group in the radical X or Y, the production of compounds of the formula (I) may be carried out in principle according to the said process if the ester grozp is already contained in the coupling component. In some cases, however, it is expedient to carry out first coupling and then esterification. Free acids, their anhydrides, chlorides or esters are suitable for esterification, and inert diluents for solvents such as monochlorobenzene, dichlorobenzene, trichlorobenzene, tetrahydrofuran, dioxane, dimethylformamide, nitrobenzene, N-methylpyrrolidone and pyridine may conveniently be added.

In esterification with free acids it may be advantageous to add inorganic or organic catalysts, for example hydrogen chloride or p-toluenesulfonic acid and to allow the water formed to escape from the reaction mixture by evaporation. When acid anhydrides or acid chlorides are used for esterification the corresponding acids may in special cases be used as the solvent. Thus the reaction with acetic anhydride may be carried out in glacial acetic acid. When using acid chlorides as esterification agents it is advantageous to add to the reaction mixture an acid-binding agent for example sodium carbonate, sodium acetate, magnesium oxide and pyridine. Examples of specific esterification agents are: formic acid, acetic acid, chloroacetic acid and the esters, anhydrides or chlorides of these acids, and ethyl chloroformate, diketene, phenyl isocyanate and methyl isocyanate.

The N-acyl group X or Y is introduced by a conventional method, for example by reaction of the coupling components of the formula (III), with X and/or Y being hydrogen, or of the dyes of the formula (I), with Y being hydrogen, with, for example, formic acid, an acid anhydride, an acid chloride, ketene, diketene, an isocyanate, an alkylsulfonyl chloride or an arylsulfonyl chloride. Details of the reactions will be found in the Examples.

Of particular industrial value are dyes and dye mixtures of the formula (Ia):

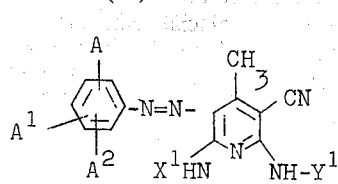

where A is nitro, cyano, chloro, bromo, carbomethoxy, carbethoxy, β-methoxycarbethoxy, methylsulfonyl, ethylsulfonyl, methyl, methoxy and phenazo; $A^1$ is hydrogen, nitro, chloro, bromo, cyano, methyl methoxy, carbomethoxy, carbethoxy, methylsulfonyl and ehtylsulfonyl; $A^2$ is hydrogen, chloro, bromo, cyano, methyl, methoxy, carbomethoxy and carbethoxy; and one of the radicals $X^1$ and $Y^1$ denotes formyl, alkanoyl of one to three carbon atoms, benzoyl, alkylsulfonyl of one to four carbon atoms, phenylsulfonyl or tolylsulfonyl and the other radical is hydrogen or a radical containing a hydroxyl group which may be esterified by formyl.

Examples of preferred radicals containing hydroxyl groups are: —(CH$_2$)$_3$—O—(CH$_2$)$_4$—OH; —(CH$_2$)$_2$—O—(CH$_2$)$_2$—OH,

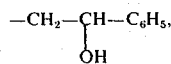

—CH$_2$—CH$_2$—CH$_2$—OH, and —CH$_2$—CH$_2$—OH.

The corresponding dyes which contain (as diazo components) benzothiazole (which may be substituted by nitro, chloro, bromo, cyano, methyl, methylmercapto, β-carbomethoxyethylmercapto, β-carbethoxyethylmercapto, carbomethoxy, carbethoxy or acetyl, benzoisothiazole, thiazole, thiadiazole or thiophene are also particularly valuable.

Specific particularly valuable diazo components include the following: 4-nitroaniline, 2-chloro-4-nitroaniline, 2-bromo-4-nitroaniline, 2-cyano-4-nitroaniline, 2-methoxy-4-nitroaniline, 2-amino-5-nitrophenylsulfonyl dimethylamide, 2-amino-5-nitrophenylsulfonyl butylamide, 2-amino-5-nitrophenylsulfonyl β-methoxyethylamide, 2-aminobenzonitrile, 3-chloro-4-aminobenzonitrile, 2-chloro-5-amino-benzonitrile, 2-amino-5-chlorobenzonitrile, 3,5-dichloro-2-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2-chloro-6-bromo-4-nitroaniline, 2,4-dinitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, 2-aminobenzoic acid esters, 4-aminobenzoic acid esters, 2-amino-5-nitrobenzoic acid esters, 2-amino-3-chloro-5-nitrobenzoic acid esters, 2-amino-3,5-dichlorobenzoic acid esters, 2-amino-3,5-dibromobenzoic acid esters, methyl-2-amino-3,5-dinitrobenzoate, β-methoxyethyl 2-amino-3,5-dinitrobenzoate, diethyl 2-aminoterephthalate, 4-aminoazobenzene, 2,3'-dimethyl-4-aminoazobenzene, 2',3-dimethyl-4-aminoazobenzene, 2,5-dimethyl-4-aminoazobenzene, and 3,5-dibromo-4-aminoazobenzene.

Particularly valuable heterocyclic diazo components include the following: 2-amino-5-nitrothiazole, 2-amino-4-methyl-5-nitrothiazole, 2-amino-4-methylthiazole-5-carboxylic ethyl ester, 2-amino-5-phenyl-1,3,4-thiadiazole, 3-phenyl-5-amino-1,2,4-thiadiazole, 3-methylmercapto-5-amino-1,2,4-thiadiazole, 3-β-carbomethoxyethylmercapto-5-amino-1,2,4-thiadiazole, 3-β-carbethoxyethylmercapto-5-amino-1,2,4-thiadiazole, 2-amino-6-cyanobenzothiazole, 2-amino-6-carboxylic acid methyl ester benzothiazole, 2-amino-6-nitrobenzothiazole, 2-amino-3-cyano-4-methylthiophene-5-carboxylic esters, 3-amino-5-nitro-2,1-benzoisothiazole, 3-amino-5-nitro-7-chloro-2,1-benzoisothiazole, 3-amino-5-nitro-7-bromo-2,1-benzoisothiazole, 4-amino-7-nitro-1,2-benzoisothiazole, 4-amino-5-bromo-1,2-benzoisothiazole, 4-amino-5-bromo-7-nitro-1,2-benzoisothiazole, 4-amino-5-cyano-7-nitro-1,2-benzoisothiazole, 4-amino-5-chloro-7-nitro-1,2-benzoisothiazole.

The new dyes are yellow to blue and are suitable for dyeing textile material of acrylonitrile polymers, synthetic polyamides, cellulose esters such as secondary acetate or triacetate rayon, and particularly synthetic linear polyesters such as polyethylene glycol terephthalate or polymers having a similar chemical structure.

The dyes are also suitable for dyeing in organic solvents, such as perchloroethylene, and for transfer printing, provided they sublime at temperatures of from 160° to 240° C. They are however particularly applied from aqueous dispersion and according to the thermosol method. Dyeings are obtained which are distinguished by high tinctorial strength and outstanding fastness properties.

The following examples, in which the parts and percentages are by weight unless otherwise specified, illustrate the invention.

EXAMPLE 1 a. Production of the coupling component:

100 parts by volume of glacial acetic acid is added to 81 parts of the reaction product of 2,6-dichloro-3-cyano-4-methylpyridine first with the amine of the formula H$_2$N—(CH$_3$)$_3$—O—(CH$_2$)$_4$—OH and then with amonia; while stirring, 30 parts of methanesulfonyl chloride is added. The whole is stirred for two hours at ambient temperature, about 80 parts by volume of acetic acid is distilled off at subatmospheric pressure and the residue is diluted with 500 parts of water and 35 parts of 50% caustic soda solution. The oil which separates is extracted with ethyl acetate. After the extractant has been evaporated about 93 parts of a brown oil is obtained of the probable formula:

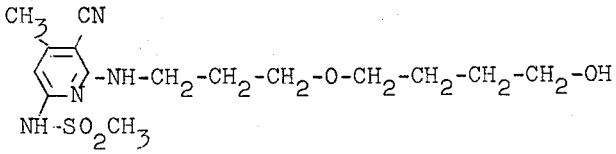

b. Diazotization and coupling:

7.8 parts of 2-amino-3-chloro-5-nitrobenzonitrile is introduced at 0° to 4° C in portions into a mixture of 40 parts of 96% sulfuric acid and 13 parts of 23% nitroxylsulfonic acid. The whole is stirred for four hours at 0° to 4° C and the diazonium salt mixture is then added in portions to a solution, cooled to 0° C, of 14.3 parts of the abovementioned coupling component in 1,500 parts of water and 11 parts of concentrated hydrochloric acid. Sodium acetate and ice are then added to the coupling mixture so that the pH is kept at 2 and the temperature does not rise above 0° C. After coupling has been completed the mixture is heated at from 50° to 80° C, suction filtered and washed with water. After drying about 21 parts of a dark red powder is obtained having the probable formula:

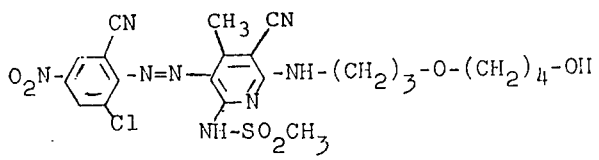

The powder dissolves is dimethylformamide to give a ruby color and dyes polyethylene glycol terephthalate fabric (by the high temperature and carrier dyeing methods) full bluish red hues of excellent fastness properties.

EXAMPLE 2

6 parts of the dye of the formula:

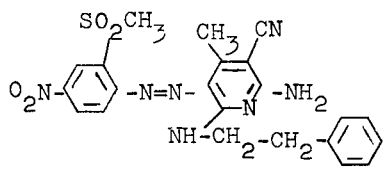

is stirred with 75 parts by volume of acetic acid and 20 parts of acetic anhydride for 2 hours under reflux. About 50 parts of volume of acetic acid is then distilled off, if necessary, at subatmospheric and 400 parts by volume of water is added to the residue. The precipitated dye of the probable formula:

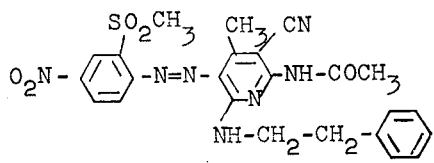

is suction filtered, washed with water and dried. 6 parts of a red powder is obtained which dissolves in dimethylformamide a dark red color and dyes polyethylene glycol terephthalate fabric full red hues having excellent fastness properties.

EXAMPLE 3

45 parts of the product of the formula:

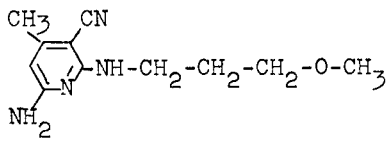

is dissolved in 100 parts by volume of acetic acid at 80° C; then 26 parts of acetic anhydride is added and the mixture is stirred for 10 hours at 80° to 110° C. About 60 parts by volume of glacial acetic acid is distilled off and the residue has added to it 500 parts by volume of water and then 50% caustic soda solution until the pH is from about 2 to 4.5. After cooling, about 45 parts of a crystalline colorless powder is obtained having the probable formula:

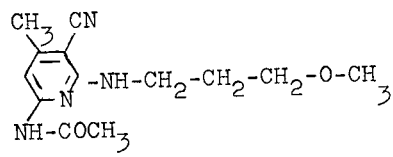

which melts at 120° C.

10.5 parts of this powder is dissolved in 100 parts by volume of glacial acetic acid and 15 parts by volume of hydrochloric acid, and then a small amount of sulfamic acid and 2,000 parts of ice-water are added. The diazonium salt mixture of 7.8 parts of 2-amino-3-chloro-5-nitrobenzonitrile, 40 parts of sulfuric acid and 13 parts of 23% nitrosylsulfuric acid (as described in Example 1) is gradually added to this mixture at 0° C. The pH of the coupling mixture is raised to 2 to 3 by adding sodium formate solution. After coupling has been completed the mixture is heated to 80° C, filtered and the precipitated dye of the probable formula:

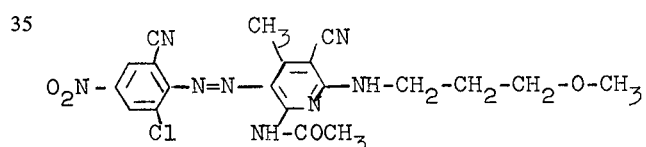

is washed with water and dried. A dark red powder is obtained which dissolves in N-methylpyrrolidone to give a ruby color and dyes polyethylene glycol terephthalate fabric bluish red hues having excellent fastness properties by the high temperature and carrier dyeing methods.

EXAMPLE 4

11.8 parts of the product of the formula:

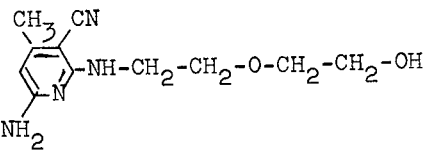

is dissolved in 30 parts by volume of anhydrous acetic acid then 7.7 parts of benzoyl chloride and 5 parts of anhydrous sodium acetate are added; the whole is stirred for from five to ten hours at 50° to 100° C and diluted with 1,500 parts of water and 20 parts by volume of 30% hydrochloric acid. The mixture thus obtained is cooled to 0° C and the following diazonium salt solution is gradually added: 9.2 parts of 2,4-dinitroaniline is dissolved at 70° C in 40 parts of sulfuric acid and cooled to 10° to 15°. 15.8 parts of nitrosylsulfuric acid (23%) is then dripped in. The whole is stirred for one hour at this temperature and then this mixture is added to 125 parts of ice and 60 parts by volume of water. Stirring is continued for another hour at 0° to 5° C, after which time the mixture is filtered and added to the solution of the coupling component.

While the coupling mixture is at 0° C coupling is rapidly ended by adding aqueous caustic soda solution until the pH has risen to 2.5. After coupling is over the mixture is heated to about 50° C, suction filtered and the precipitated dye of the probable formula:

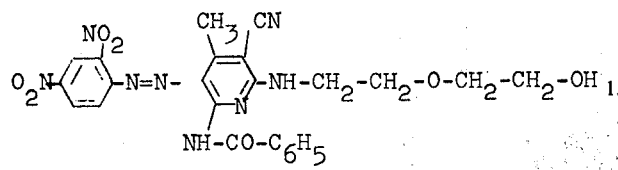

is washed with hot water until it is salt-free. About 25 parts of a dark brown powder is obtained which dissolves in dimethylformamide to give a reddish violet color and dyes polyethylene glycol terephthalate fabric full ruby red hues by the carrier and high temperature methods; the dyeings have very good fastness properties.

EXAMPLE 5

11.8 parts of 2-aminobenzonitrile is dissolved at room temperature in 300 parts by volume of water and 40 party by volume of 30% hydrochloric acid. 300 parts of ice and 31 parts by volume of 23% sodium nitrite solution is then added, and the whole is stirred for 2 hours at 0° to 5° C and filtered. Any excess of nitrous acid present is destroyed as usual. The diazonium salt solution thus obtained is added in portions to a solution or suspension, cooled to 0° C, of 28.2 parts of the coupling component of the formula:

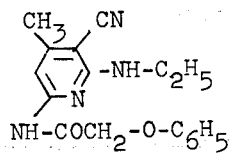

in a mixture of about 100 parts of dimethylformamide, 30 parts of 30% hydrochloric acid and 100 parts of water. To accelerate the coupling reaction the coupling mixture is brought to a pH of 2.5 to about 3.5 by adding 50% caustic soda solution. About 1,000 parts by volume of ice-water is added during coupling to enable the mixture to be stirred more easily.

The precipitated dye of the formula:

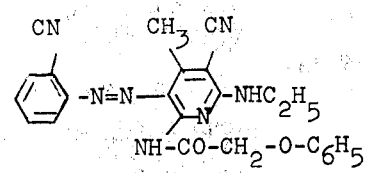

is suction filtered, washed with water and dried. About 36 parts of a yellow powder is obtained which dissolves in dimethylformamide to give a yellow color and dyes polyethylene terephthalate fabric full greenish yellow hues fast to light.

EXAMPLE 6

7 parts of the dye of the formula:

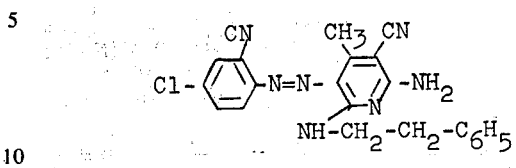

is stirred for six hours at 100° C with 60 parts by volume of anhydrous acetic acid and 4 parts of diketene; another 4 parts of diketene is then added and the whole is stirred for another 6 hours at 100° C. About 30 parts by volume of acetic acid is distilled off. The dye of the formula:

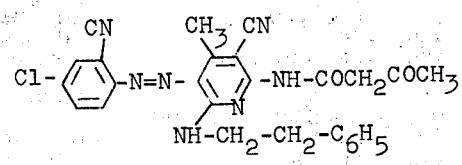

is isolated conventionally. About 7 parts of a yellowish brown powder is obtained which dissolves in dimethylformamide to give a dark yellow color and dyes polyethylene glycol terephthalate fabric golden yellow hues having very good fastness properties by the carrier and high temperature dyeing methods (130° C).

EXAMPLE 7

At 0° to 4° C and while stirring well, 49 parts of 2-amino-5-nitrobenzonitrile is added in portions to a mixture of 240 parts of concentrated sulfuric acid and 98 parts of 23% nitrosylsulfuric acid. The mixture is stirred for from 4 to 5 hours at 0° to 4° C and is then added in portions to a suspension of 123 parts of the coupling component of the formula:

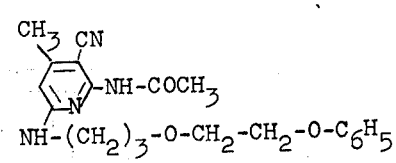

acid and 150 parts of water.

Ice and sodium formate solution are added during coupling so that the pH of the mixture is from 2 to 0 and the temperature is about 0° C. After coupling is over the dye of the formula:

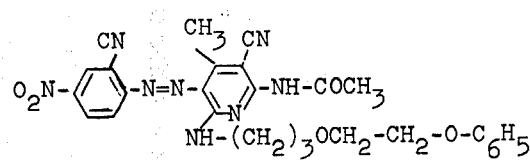

is isolated by a conventional method. A dark red powder is obtained which dyes polyester fibers very easily.

The hues given in the Tables refer to dyeings with the dyes on polyethylene glycol terephthalate:

TABLE 1

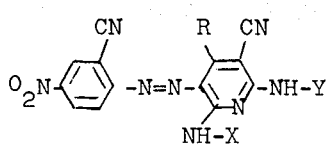

| No. | R | X | Y | Hue |
|---|---|---|---|---|
| 8 | CH₃ | —COCH₃ | —(CH₂)₃—O—(CH₂)₄—OH | scarlet |
| 9 | H | " | " | " |
| 10 | C₃H₇ | " | " | " |
| 11 | CH₃ | —COC₂H₅ | " | " |
| 12 | " | —COCH₂CH₂OCH₃ | " | " |
| 13 | " | —COCH₃ | —CH₂—CH₂—C₆H₅ | " |
| 14 | " | " | —CH₂—CH—C₆H₅<br>     \|<br>    OH | " |
| 15 | " | " | —(CH₂)₃—O—(CH₂)₂—OC₆H₅ | " |
| 16 | " | " | —(CH₂)₃—O—CH₂—C₆H₅ | " |
| 17 | " | —COCH₂—O—C₆H₅ | —CH₂—CH₂ O—CH₃ | " |
| 18 | C₆H₅ | —COCH₃ | —CH₂—CH₂—O—CH₂—CH₂OH | " |
| 19 | CH₃ | —CH₂—CH₂—C₆H₅ | —COCH₂—COCH₃ | yellowish red |
| 20 | " | " | —COCH₃ | scarlet |
| 21 | " | —(CH₂)₃—O—(CH₂)₄—OH | " | " |
| 22 | H | —SO₂CH₃ | —(CH₂)₃—O—(CH₂)₄—OH | " |
| 23 | CH₃ | —CO₂C₆H₅ | —(CH₂)₂—O—(CH₂)₂—OH | " |
| 24 | " | —SO₂CH₃ | —CH₂—CH—C₆H₅<br>     \|<br>    OH | " |
| 25 | " | " | —CH₂—CH₂—C₆H₅ | " |
| 26 | " | —SO₂—C₂H₅ | —CH₂—CH—C₆H₅<br>     \|<br>    OH | " |
| 27 | " | —SO₂—CH₃ | —(CH₂)₃—O—(CH₂)₂—OC₆H₅ | " |
| 28 | " | —CH₂—CH₂—C₆H₅ | —SO₂CH₃ | " |
| 29 | " | —(CH₂)₃—O—(CH₂)₂—OC₆H₅ | " | " |

TABLE 2

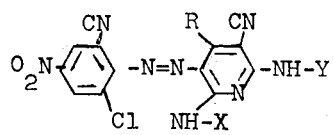

| No. | R | X | Y | Hue |
|---|---|---|---|---|
| 30 | —CH₃ | —COCH₃ | —(CH₂)₃—O—(CH₂)₄—OH | bluish red |
| 31 | —CH₃ | —COC₂H₅ | " | " |
| 32 | " | " | —(CH₂)₂—O—(CH₂)₂—OH | " |
| 33 | —C₃H₇(n) | —COCH₃ | —(CH₂)₃—O—(CH₂)₄—OH | " |
| 34 | —CH₃ | —CO₂CH₃ | —CH₂—CH₂—C₆H₅ | " |
| 35 | " | —COCH₃ | " | " |
| 36 | " | " | —CH₂—CH—C₆H₅<br>     \|<br>    OH | " |
| 37 | " | " | —(CH₂)₃—O—CH₂—C₆H₅ | " |
| 38 | " | " | —(CH₂)₃—O—(CH₂)₂—O—C₆H₅ | " |
| 39 | " | —CH₂—CH₂—C₆H₅ | —COCH₃ | " |
| 40 | " | —(CH₂)₃—O—(CH₂)₂—O—C₆H₅ | " | " |
| 41 | " | —CO—C₆H₅ | —(CH₂)₂—O—(OH₂)₂—OH | " |
| 42 | " | —COCH₂—O—C₆H₅ | —CH₂—CH₂—O—CH₃ | " |
| 43 | " | " | —CH₂—CH₂—OH | " |
| 44 | " | —CH₂CH₂C₆H₅ | —SO₂CH₃ | " |
| 45 | " | —(CH₂)₃—O—(CH₂)₂—O—C₆H₅ | " | " |
| 46 | " | —SO₂CH₃ | —(CH₂)₃—O—(CH₂)₄—OH | " |
| 47 | " | —SO₂C₂H₅ | " | " |
| 48 | " | " | —(CH₂)₂O—(CH₂)₂—OH | " |
| 49 | " | —SO₂CH₃ | —CH₂—CH₂—C₆H₅ | " |
| 50 | " | " | —CH₂—CH—C₆H₅<br>     \|<br>    CH₃ | " |
| 51 | " | —SO₂—C₆H₅ | —(CH₂)₂—O—(CH₂)₂—OH | " |
| 52 | —C₃H₇(i) | —SO₂CH₃ | —(CH₂)₃—O—(CH₂)₄—OH | " |
| 53 | —CH₃ | —SO₂CH₃ | —C₆H₅ | " |
| 54 | " | —COCH₃ | " | " |
| 55 | " | —CONH—C₄H₉(n) | —CH₂—CH₂—CH₂—OCH₃ | " |

TABLE 3

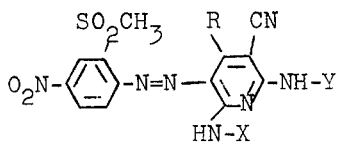

| No. | R | X | Y | Hue |
|---|---|---|---|---|
| 56 | —CH₃ | —COCH₃ | —(CH₂)₃—O—(CH₂)₄—OH | red |
| 57 | '' | —COC₂H₅ | '' | '' |
| 58 | '' | —COCH₂OC₆H₅ | —CH₂—CH₂—CH₂—OH | '' |
| 59 | '' | '' | —CH₂—CH₂—C₆H₅ | '' |
| 60 | '' | —COCH₃ | —(CH₂)₂—O—(CH₂)₂—O—C₆H₅ | '' |
| 61 | '' | —CH₂—CH₂—OCH₃ | —COCH₂—O—C₆H₅ | ruby |
| 62 | —C₂H₅ | —COCH₃ | —(CH₂)₃—O—(CH₂)₄—OH | bluish red |
| 63 | —C₃H₇(n) | '' | '' | bluish red |
| 64 | —CH₃ | —SO₂CH₃ | '' | red |
| 65 | '' | —SO₂C₆H₅ | —(CH₂)₂O—(CH₂)₂—OH | '' |
| 66 | —C₂H₅ | '' | '' | '' |
| 67 | —C₃H₇ | —SO₂CH₃ | '' | '' |
| 68 | —H | '' | —(CH₂)₃—O—(CH₂)₄—OH | '' |
| 69 | —CH₃ | '' | —C₆H₅ | bluish red |
| 70 | '' | '' | —CH₂—CH₂—C₆H₅ | red |
| 71 | '' | '' | —CH₂—CH—C₆H₅<br>         OH | '' |
| 72 | '' | '' | —(CH₂)₃—O—CH₂—C₆H₅ | '' |
| 73 | '' | '' | —(CH₂)₃—O—(CH₂)₂—O—C₆H₅ | '' |

TABLE 4

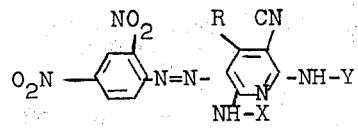

| No. | R | X | Y | Hue |
|---|---|---|---|---|
| 74 | —CH₃ | —COCH₃ | —(CH₂)₃—O—(CH₂)₄OH | bluish red |
| 75 | —C₂H₅ | '' | '' | '' |
| 76 | —C₃H₇(n) | '' | '' | '' |
| 77 | —H | '' | '' | '' |
| 78 | —C₆H₅ | '' | '' | '' |
| 79 | —H | —COC₂H₅ | —(CH₂)₃—O—(CH₂)₄—OH | '' |
| 80 | —CH₃ | '' | '' | '' |
| 81 | —C₂H₅ | '' | '' | '' |
| 82 | —CH₃ | —COCH₂OC₆H₅ | —CH₂—CH₂—OH | '' |
| 83 | '' | '' | —CH₂—CH₂—CH₂—OH | '' |
| 84 | '' | '' | —CH₂—CH₂—O—CH₃ | '' |
| 85 | '' | —COCH₃ | —C₆H₅ | ruby |
| 86 | '' | —CO₂CH₃ | —C₆H₅ | ruby |
| 87 | '' | —COCH₃ | —CH₂—CH₂—C₆H₅ | bluish red |
| 88 | '' | —COCH₃ | —(CH₂)₃—O—(CH₂)₂—O—C₆H₅ | '' |
| 89 | '' | —CH₂—CH₂—C₆H₅ | —COCH₃ | '' |
| 90 | '' | '' | —COOCH₃ | '' |
| 91 | '' | '' | —COCH₂—COCH₃ | ruby |
| 92 | '' | —CH₂—CH₂—CH₂—OCOCH₃ | —COCH₃ | bluish red |
| 93 | '' | —SO₂CH₃ | | '' |
| 94 | '' | —(CH₂)₃—O—(CH₂)₄OCOCH₃ | —COCH₃ | '' |
| 95 | '' | —SO₂CH₃ | —(CH₂)₃—O—(CH₂)₄—OH | '' |
| 96 | —H | —SO₂C₂H₅ | '' | '' |
| 97 | —CH₃ | —SO₂C₆H₅ | —(CH₂)₂—O—(CH₂)₂OH | '' |
| 98 | '' | —SO₂CH₃ | —C₆H₅ | ruby |
| 99 | '' | '' | —CH₂—CH₂—C₆H₅ | bluish red |
| 100 | '' | '' | —CH₂—CH—C₆H₅<br>         OH | '' |
| 101 | '' | '' | —(CH₂)₃—O—CH₂—C₆H₅ | '' |
| 102 | '' | '' | —(CH₂)₃—O—(CH₂)₂—O—C₆H₅ | '' |
| 103 | —H | '' | | ruby |
| 104 | —CH₃ | '' | —CH₂—CH₂—CH₂—OH | bluish red |
| 105 | '' | '' | —CH₂—CH—CH₃<br>        OH | '' |
| 106 | '' | —CH₂—CH₂—OH | —SO₂CH₃ | '' |
| 107 | '' | —CH₂—CH₂—CH₂—OH | '' | '' |
| 108 | '' | —C₂H₅ | '' | '' |
| 109 | '' | —C₃H₇(n) | '' | '' |
| 110 | '' | —C₄H₉(n) | '' | '' |
| 111 | '' | —CH₂—CH₂—CH₂—OCH₃ | '' | '' |
| 112 | '' | —(CH₂)₃—O—CH(CH₃)₂ | '' | '' |
| 113 | '' | —CH₂—CH₂—C₆H₅ | '' | '' |
| 114 | '' | —C₆H₅ | '' | '' |

TABLE 5

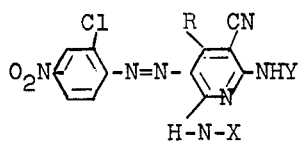

| No. | R | X | | Y | Hue |
|---|---|---|---|---|---|
| 115 | —H | —COCH$_3$ | | —(CH$_2$)$_3$—O—(CH$_2$)$_4$—OH | red orange |
| 116 | —CH$_3$ | " | | " | " |
| 117 | —H | —COC$_2$H$_5$ | | " | " |
| 118 | " | —COCH$_3$ | " | —(CH$_2$)$_2$—O—(CH$_2$)$_2$—OH | " |
| 119 | " | " | " | —CH$_2$—CH$_2$—CH$_2$—OH | " |
| 120 | " | " | " | —(CH$_2$)$_3$—O—COCH$_3$ | " |
| 121 | " | " | " | —CH$_2$—CH$_2$—C$_6$H$_5$ | " |
| 122 | —H | | " | " | scarlet |
| 123 | " | | " | —(CH$_2$)$_3$—O—(CH$_2$)$_2$—O—C$_6$H$_5$ | red orange |
| 124 | " | | " | —(CH$_2$)$_3$—O—CH$_2$—C$_6$H$_5$ | " |
| 125 | " | | " | —CH$_2$—CH(OH)—C$_6$H$_5$ | " |
| 126 | —CH$_3$ | —CH$_2$—CH$_2$—CH$_2$—OCOCH$_3$ | | —COCH$_3$ | orange |
| 127 | " | —CH$_2$—CH$_2$—C$_6$H$_5$ | | " | " |
| 128 | " | —(CH$_2$)$_3$—O—(CH$_2$)$_2$—O—C$_6$H$_5$ | | " | " |
| 129 | " | —CH$_2$—CH$_2$—OCH$_3$ | | —COCH$_2$—O—C$_6$H$_5$ | " |
| 130 | " | —C$_6$H$_5$ | | —COCH$_2$COCH$_3$ | scarlet |
| 131 | " | —C$_6$H$_5$ | | —COCH$_3$ | " |
| 132 | —C$_2$H$_5$ | —COCH$_3$ | | —C$_6$H$_5$ | " |
| 133 | —C$_3$H$_7$(n) | —COCH$_3$ | | —C$_6$H$_5$ | " |
| 134 | —CH$_3$ | —COC$_6$H$_5$ | | —(CH$_2$)$_2$—O—(CH$_2$)$_2$OH | " |
| 135 | " | —COC$_6$H$_5$ | | —CH$_2$—CH$_2$—CH$_2$OH | " |
| 136 | " | —COCH=CH—C$_6$H$_5$ | | —CH$_2$—CH$_2$OCH$_3$ | orange |
| 137 | " | —SO$_2$CH$_3$ | | —(CH$_2$)$_3$—O—(CH$_2$)$_4$—OH | red orange |
| 138 | " | —SO$_2$C$_2$H$_5$ | | —(CH$_2$)$_3$—O—(CH$_2$)$_4$—OH | " |
| 139 | " | —SO$_2$C$_6$H$_5$ | | —(CH$_2$)$_2$—O—(CH$_2$)$_2$—OH | " |
| 140 | " | —SO$_2$CH$_3$ | | —CH$_2$—CH$_2$—C$_6$H$_5$ | " |
| 141 | " | " | " | —(CH$_2$)$_3$—O—(CH$_2$)$_2$—O—C$_6$H$_5$ | " |
| 142 | " | " | | —CH$_2$—CH(OH)—C$_6$H$_5$ | " |
| 143 | —H | " | | —CH$_2$—CH$_2$—C$_6$H$_5$ | " |
| 144 | —H | " | | —(CH$_2$)$_3$—O—(CH$_2$)$_4$OH | " |
| 145 | —H | " | | —(CH$_2$)$_3$—O—(CH$_2$)$_2$—O—C$_6$H$_5$ | " |
| 146 | —H | —(CH$_2$)$_3$—O—(CH$_2$)$_2$—O—C$_6$H$_5$ | | —SO$_2$CH$_3$ | orange |
| 147 | —CH$_3$ | " | | " | " |
| 148 | —CH$_3$ | —CH$_2$—CH$_2$—C$_6$H$_5$ | | " | " |
| 149 | —CH$_3$ | —C$_6$H$_5$ | | " | red orange |
| 150 | —CH$_3$ | —SO$_2$CH$_3$ | | —C$_6$H$_5$ | " |

TABLE 6

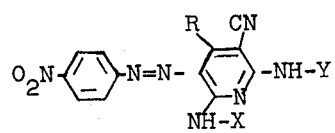

| No. | R | X | | Y | Hue |
|---|---|---|---|---|---|
| 151 | —H | —COCH$_3$ | | (CH$_2$)$_3$—O—(CH$_2$)$_4$—OH | orange |
| 152 | —CH$_3$ | " | | " | " |
| 153 | " | " | | —(CH$_2$)$_3$—O—(CH$_2$)$_4$—OCOCH$_3$ | " |
| 154 | " | " | | —(CH$_2$)$_2$—O—(CH$_2$)$_2$—OH | " |
| 155 | " | " | | —CH$_2$—CH$_2$—CH$_2$—OH | " |
| 156 | " | —COCH$_2$—O—C$_6$H$_5$ | | —CH$_2$—CH$_2$—CH$_2$—OH | " |
| 157 | " | " | | —CH$_2$—CH$_2$—OH | " |
| 158 | " | —COCH$_3$ | | —CH$_2$—CH$_2$—OH | " |
| 159 | " | " | | —CH$_2$—C$_6$H$_5$ | " |
| 160 | " | " | | —CH$_2$—CH$_2$—C$_6$H$_5$ | " |
| 161 | " | " | | —CH$_2$—CH(OH)—C$_6$H$_5$ | |
| 162 | " | " | | —(CH$_2$)$_3$—O—(CH$_2$)$_2$—O—C$_6$H$_5$ | " |
| 163 | " | " | | —COCH$_3$ | yellowish orange |
| 164 | " | —(CH$_2$)$_3$—O—(CH$_2$)$_2$—O—C$_6$H$_5$ | | —COCH$_3$ | " |
| 165 | " | —SO$_2$CH$_3$ | | —(CH$_2$)$_3$—O—(CH$_2$)$_4$—OH | orange |
| 166 | " | " | | —(CH$_2$)$_2$—O—(CH$_2$)$_2$—OH | " |
| 167 | " | " | | —(CH$_2$)$_3$—OH | " |
| 168 | " | " | | —C$_6$H$_5$ | " |
| 169 | " | " | | " | " |

TABLE 6—Continued

| No. | R | X | Y | Hue |
|---|---|---|---|---|
| 170 | " | " | —CH$_2$—CH$_2$—C$_6$H$_5$ | " |
| 171 | " | " | —CH$_2$—CH—C$_6$H$_5$ <br>         OH | " |
| 172 | " | " | —CH$_2$—CH—C$_6$H$_5$ <br>         OH | " |
| 173 | " | " | —CH$_2$—CH$_2$—CH—C$_6$H$_5$ <br>                OH | " |
| 174 | " | " | —(CH$_2$)$_3$—O—(CH$_2$)$_2$—O—C$_6$H$_5$ | " |
| 175 | " | —(CH$_2$)$_3$—O—(CH$_2$)$_2$—O—C$_6$H$_5$ | —SO$_2$CH$_3$ | yellowish orange |
| 176 | " | —CH$_2$—CH$_2$—C$_6$H$_5$ | —SO$_2$CH$_3$ | " |

TABLE 7

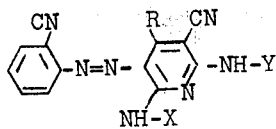

| No. | R | X | Y | Hue |
|---|---|---|---|---|
| 177 | —CH$_3$ | —COCH$_3$ | (CH$_2$)$_2$—O—(CH$_2$)$_2$—OH | yellow |
| 178 | " | " | —(CH$_2$)$_3$—O—(CH$_2$)$_4$—OH | " |
| 179 | " | " | —CH$_2$—CH$_2$—CH$_2$—OH | " |
| 180 | " | " |  | " |
| 181 | " | —CO$_2$CH$_3$ | " | " |
| 182 | " | —COCH$_3$ | CH$_2$—CH$_2$—C$_6$H$_5$ | " |
| 183 | " | —COCH$_3$ | —CH$_2$—CH—C$_6$H$_5$ <br>         OH | " |
| 184 | " | —COCH$_2$ | (CH$_2$)$_3$—O—(CH$_2$)$_2$—O—C$_6$H$_5$ | " |
| 185 | " | —COC$_6$H$_5$ | —(CH$_2$)$_2$—O—(CH$_2$)$_2$—OH | " |
| 186 | " | —COCH$_2$—O—C$_6$H$_5$ | —CH$_2$—CH$_2$—OH | " |
| 187 | " | " | —(CH$_2$)$_3$—OH | " |
| 188 | " | —CH$_2$—CH$_2$—C$_6$H$_5$ | —CO$_2$CH$_3$ | " |
| 189 | " | —SO$_2$CH$_3$ | —(CH$_2$)$_3$—O—(CH$_2$)$_4$—OH | " |
| 190 | —H | " | " | " |
| 191 | —CH$_3$ | " | " | " |
| 192 | —C$_3$H$_7$(n) | " | " | " |
| 193 | —CH$_3$ | " | —(CH$_2$)$_2$—O—(CH$_2$)$_2$—OH | " |
| 194 | " | —SO$_2$C$_6$H$_5$ | —(CH$_2$)$_2$—O—(CH$_2$)$_2$—OH | " |
| 195 | " |  | " | " |
| 196 | " | —SO$_2$CH$_3$ | —(CH$_2$)$_3$—O—(CH$_2$)$_2$—O—C$_6$H$_5$ | " |
| 197 | " | —SO$_2$CH$_3$ | —CH$_2$—CH$_2$—C$_6$H$_5$ | " |
| 198 | " | —SO$_2$CH$_3$ | —C$_6$H$_5$ | " |
| 199 | " | —C$_6$H$_5$ | —SO$_2$CH$_3$ | " |
| 200 | " | —CH$_2$—CH$_2$—C$_6$H$_5$ | —SO$_2$CH$_3$ | " |
| 201 | " | —(CH$_2$)$_3$—O—(CH$_2$)$_2$—C—C$_6$H$_5$ | —SO$_2$CH$_3$ | " |
| 202 | " | —CO—CH$_2$—CN | —CH$_2$—CH$_2$—OH | " |
| 203 | " | —SO$_2$CH$_3$ | —CH$_2$—CH$_2$—COOCH$_3$ | " |
| 204 | " | —COCH=CH—C$_6$H$_5$ | —C$_2$H$_5$ | " |

TABLE 8

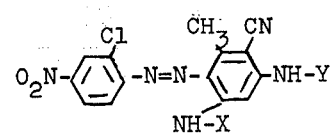

| No. | R | X | Y | Hue |
|---|---|---|---|---|
| 205 | —CH$_3$ | —COCH$_3$ | —(CH$_2$)$_3$—O—(CH$_2$)$_4$—OH | scarlet |
| 206 | " | —COCH$_3$ | —(CH$_2$)$_3$—O—(CH$_2$)$_4$—OH | " |
| 207 | " | —COCH$_3$ | —CH$_2$—CH$_2$—CH$_2$—OH | " |
| 208 | " | —COCH$_2$—O—C$_6$H$_5$ | —CH$_2$—CH$_2$—OH | " |
| 209 | " | —SO$_2$CH$_3$ | —CH$_2$—CH$_2$—C$_6$H$_5$ | " |
| 210 | " | —CH$_2$—CH$_2$—C$_6$H$_5$ | —COCH$_3$ | " |
| 211 | " | —CH$_2$—CH$_2$—C$_6$H$_5$ | —SO$_2$CH$_3$ | " |
| 212 | " | —SO$_2$CH$_3$ | —(CH$_2$)$_3$—O—(CH$_2$)$_2$—O—C$_6$H$_5$ | " |

TABLE 9

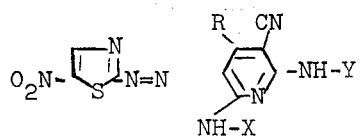

| No. | R | X | Y | Hue |
|---|---|---|---|---|
| 213 | —CH₃ | —CHO | —(CH₂)₃—O—(CH₂)₄—OH | bluish red |
| 214 | —H | —COCH₃ | ″ | ″ |
| 215 | —CH₃ | ″ | ″ | ″ |
| 216 | ″ | ″ | —(CH₂)₂—O—(CH₂)₂—OH | ″ |
| 217 | ″ | ″ | —CH₂—CH₂—CH₂—OH | ″ |
| 218 | ″ | ″ | —CH₂—CH₂—CH₂—OCH₃ | ″ |
| 219 | ″ | —COC₆H₅ | —(CH₂)₂—O—(CH₂)₂—OH | ″ |
| 220 | ″ | —COCH₃ | —CH₂—CH(OH)—C₆H₅ | ″ |
| 221 | ″ | ″ | —CH₂—CH₂—C₆H₅ | ″ |
| 222 | ″ | ″ | —C₆H₅ | reddish violet |
| 223 | ″ | ″ | —(CH₂)₃—O—(CH₂)₂—O—C₆H₅ | bluish red |
| 224 | ″ | —CH₂—CH₂—C₆H₅ | —CHO | ″ |
| 225 | ″ | —CH₂—CH₂—C₆H₅ | —COCH₃ | ″ |
| 226 | ″ | —SO₂CH₃ | —CH₂—CH₂—C₆H₅ | ″ |
| 227 | ″ | ″ | —CH₂—CH(OH)—C₆H₅ | ″ |
| 228 | ″ | ″ | —(CH₂)₃—O—(CH₂)₄—OH | ″ |
| 229 | ″ | ″ | —(CH₂)₂—O—(CH₂)₂—OH | ″ |
| 230 | ″ | ″ | —CH₂—CH₂—CH₂—OH | ″ |
| 231 | ″ | ″ | —CH₂—CH₂—OH | ″ |
| 232 | ″ | ″ | —CH₂—CH₂—O—CH₃ | ″ |
| 233 | ″ | —SO₂C₆H₅ | —(CH₂)₂—O—(CH₂)₂—OH | ″ |
| 234 | ″ | —SO₂CH₃ | —(CH₂)₃—O—CH₂—C₆H₅ | ″ |
| 235 | ″ | ″ | —(CH₂)₃—O—(CH₂)₂—O—C₆H₅ | ″ |
| 236 | ″ | ″ | —C₆H₅ | red violet |
| 237 | ″ | —CH₂—CH₂—C₆H₅ | —SO₂CH₃ | bluish red |
| 238 | ″ | —(CH₂)₃—O—(CH₂)₂—O—C₆H₅ | ″ | ″ |

TABLE 10

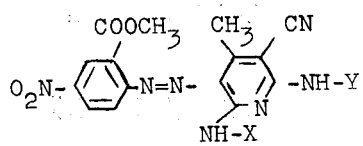

| No. | R | X | Y | Hue |
|---|---|---|---|---|
| 239 | —CH₃ | —COCH₃ | —(CH₂)₃—O—(CH₂)₄—OH | yellowish red |
| 240 | ″ | —COCH₃ | —(CH₂)₃—O—(CH₂)₆—OH | ″ |
| 241 | ″ | —COC₆H₅ | —(CH₂)₂—O—(CH₂)₂—OH | ″ |
| 242 | ″ | —COCH₃ | —CH₂—CH₂—CH₂—OH | ″ |
| 243 | ″ | —COCH₃ | —(CH₂)₃—O—(CH₂)₂—O—C₆H₅ | ″ |
| 244 | ″ | —CHO | —CH₂—CH₂—C₆H₅ | ″ |
| 245 | ″ | —COCH₃ | ″ | ″ |
| 246 | ″ | —SO₂CH₃ | ″ | ″ |
| 247 | ″ | ″ | —(CH₂)₃—O—(CH₂)₄—OH | ″ |
| 248 | ″ | ″ | —(CH₂)₃—O—(CH₂)₂—O—C₆H₅ | ″ |
| 249 | ″ | ″ | —CH₂—CH₂—C₆H₅ | ″ |
| 250 | ″ | —CH₂—CH₂—C₆H₅ | —CHO | ″ |
| 251 | ″ | ″ | —SO₂CH₃ | ″ |
| 252 | ″ | —(CH₂)₃—O—(CH₂)₂—O—C₆H₅ | —SO₂CH₃ | ″ |

TABLE 11

Coupling component:

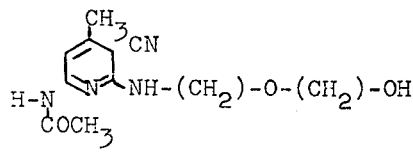

TABLE 11—Continued

| No. | Diazo component | Hue |
|---|---|---|
| 253 | 2-amino-6-chlorobenzonitrile (Cl, CN, NH₂ on benzene) | yellow |
| 254 | 2-(trifluoromethyl)aniline (CF₃, NH₂ on benzene) | greenish yellow |
| 255 | 2-bromo-6-chloro-4-nitroaniline (O₂N, Cl, Br, NH₂ on benzene) | scarlet |
| 256 | 2-amino-3,5-dibromobenzonitrile (Br, CN, NH₂, Br on benzene) | orange |
| 257 | 2-amino-6-chloro-3,5-dinitro... (NO₂, O₂N, NH₂, Cl on benzene) | bluish red |

TABLE 12

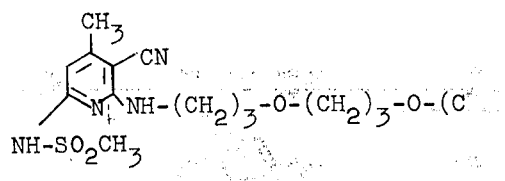

NH-SO₂CH₃ ; pyridine with CH₃, CN, NH-(CH₂)₃-O-(CH₂)₃-O-(C...

| No. | Diazo component | Hue |
|---|---|---|
| 258 | Cl, CN, NH₂ on benzene | yellow |
| 259 | CF₃, NH₂ on benzene | yellow |
| 260 | Br, CN, NH₂, Br on benzene | orange |
| 261 | O₂N, Cl, NH₂, Br on benzene | scarlet |

TABLE 12—Continued

| No. | Diazo component | Hue |
|---|---|---|
| 262 | O₂N-benzisothiazole-NH₂ | bluish red |
| 263 | O₂N, NO, NH₂, Cl on benzene | bluish red |
| 264 | CH₃-S-thiadiazole-NH₂ | yellowish orange |
| 265 | CH₃, CN, CH₃O-CO-, thiophene-NH₂ | bluish red |
| 266 | CH₃NH-O₂S-, Cl, NH₂, Cl on benzene | yellow |
| 267 | CH₃NH-CO-, Br, NH₂, Br on benzene | yellow |

TABLE 13

Coupling component:

pyridine with CH₃, CN, NH-CH₂-O-CH₂-CH₂OH, CH₃, NH-SO₂CH₃

| No. | Diazo component | Hue |
|---|---|---|
| 269 | Cl, CN, NH₂ on benzene | yellow |
| 270 | CF₃, NH₂ on benzene | yellow |
| 271 | Br, CN, NH₂, Br on benzene | yellow |

TABLE 13—Continued

| No. | Diazo component | Hue |
|---|---|---|
| 272 | O₂N-[benzisothiazole]-NH₂ | bluish red |
| 273 | [phenyl]-SO₂-[phenyl]-NH₂ | yellow |
| 274 | [phenyl]-N=N-[phenyl]-NH₂ | scarlet |
| 275 | CH₃-S-[thiadiazole]-NH₂ | orange |
| 276 | CH₃OC(O)-CH₂-CH₂-S-[thiadiazole]-NH₂ | orange |

TABLE 14

Coupling component:

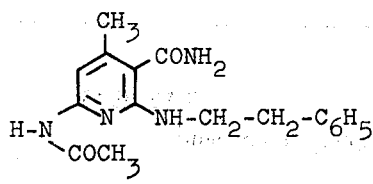

| No. | Diazo component | Hue |
|---|---|---|
| 277 | O₂N-[phenyl(CN)]-NH₂ | red |
| 278 | O₂N-[phenyl(CN)(Cl)]-NH₂ | reddish violet |
| 279 | O₂N-[phenyl(CN)(Br)]-NH₂ | reddish violet |

TABLE 14—Continued

| No. | Diazo component | Hue |
|---|---|---|
| 280 | O₂N-[phenyl(SO₂CH₃)]-NH₂ | ruby |
| 281 | O₂N-[phenyl(Cl)]-NH₂ | red |
| 282 | O₂N-[benzisothiazole]-NH₂ | blue |

TABLE 15

Coupling component:

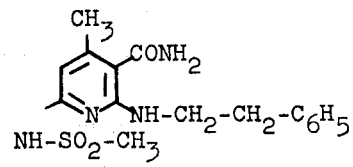

| No. | Diazo component | Hue |
|---|---|---|
| 283 | O₂N-[phenyl(CN)]-NH₂ | red |
| 284 | O₂N-[phenyl(CN)(Cl)]-NH₂ | red |
| 285 | O₂N-[phenyl(SO₂CH₃)]-NH₂ | ruby |
| 286 | O₂N-[phenyl(Cl)]-NH₂ | red |

Other valuable dyes are described in the following Tables:

Table 16

| No. | Dye | Hue |
|---|---|---|
| 287 | [structure with phenyl-N=N-dibromophenyl-N=N-pyridine with CH3, CN, NH-CH2-CH2-OH, NH-COCH3] | scarlet |
| 288 | [structure with phenyl-N=N-(CN,CN)phenyl-N=N-pyridine with CH3, CN, NH-CH2-CH2-OH, NH-COCH3] | violet |
| 289 | [structure with di-CN phenyl-N=N-pyridine with CH3, CN, NH-(CH2)3-O-(CH2)4-OH, NH-COCH3] | violet |
| 290 | [structure with phenyl-N=N-phenyl-N=N-pyridine with CH3, CN, NH-CH2-CH2-O-CH2-CH2OH, NH-SO2CH3] | orange |
| 291 | [structure with NO2, O2N, CN-phenyl-N=N-pyridine with CH3, CN, NH-(CH2)3-O-(CH2)4-OH, NH-COCH3] | violet |

TABLE 17

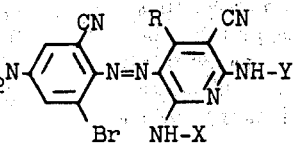

| No. | R | X | Y | Hue |
|---|---|---|---|---|
| 292 | —CH₃ | —CO₂CH₃ | —CH₂—CH₂—C₆H₅ | bluish red |
| 293 | —CH₃ | —COCH₃ | —CH₂—CH₂—C₆H₅ | " |
| 294 | —CH₃ | —COCH₃ | —(CH₂)₃—O—CH₂—C₆H₅ | " |
| 295 | —CH₃ | —COCH₃ | —(CH₂)₃—O—(CH₂)₂—O—C₆H₅ | " |
| 296 | —CH₃ | —CH₂—CH₂—C₆H₅ | —COCH₃ | " |
| 297 | —CH₃ | —(CH₂)₃—O—(CH₂)₂—O—C₆H₅ | —COCH₃ | " |
| 298 | —CH₃ | —CH₂CH₂C₆H₅ | —SO₂CH₃ | " |
| 299 | —CH₃ | —(CH₂)₃—O—(CH₂)₂—O—C₆H₅ | —SO₂CH₃ | " |
| 300 | —CH₃ | —SO₂CH₃ | —(CH₂)₃—O—(CH₂)₄—OH | " |
| 301 | —CH₃ | —SO₂CH₃ | —CH₂—CH₂—C₆H₅ | " |
| 302 | —CH₃ | —SO₂—C₆H₅ | —(CH₂)₂—O—(CH₂)₂—OH | " |

TABLE 18

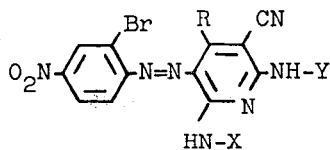

| No. | R | X | Y | Hue |
|---|---|---|---|---|
| 303 | —CH₃ | —COCH₃ | —(CH₂)₃—O—(CH₂)₄—OH | reddish orange |
| 304 | H | ″ | —(CH₂)₂—O—(CH₂)₂—OH | ″ |
| 305 | H | ″ | —(CH₂)₃—O—COCH₃ | ″ |
| 306 | H | ″ | —CH₂—CH₂—C₆H₅ | ″ |
| 307 | H | ″ | —(CH₂)₃—O—(CH₂)₂—O—C₆H₅ | ″ |
| 308 | H | ″ | —(CH₂)₃—O—CH₂—C₆H₅ | ″ |
| 309 | CH₃ | —CH₂—CH₂—CH₂—OCOCH₃ | —COCH₃ | orange |
| 310 | CH₃ | —CH₂—CH₂—C₆H₅ | ″ | ″ |
| 311 | CH₃ | —(CH₂)₃—O—(CH₂)₂—O—C₆H₅ | ″ | ″ |
| 312 | CH₃ | ″ | —CHO | ″ |
| 313 | CH₃ | —CH₂—CH₂—OCH₃ | —COCH₂—O—C₆H₅ | ″ |
| 314 | CH₃ | —COC₆H₅ | —(CH₂)₂—O—(CH₂)₂—OH | scarlet |
| 315 | CH₃ | —COCH=CH—C₆H₅ | —CH₂—CH₂OCH₃ | orange |
| 316 | CH₃ | —SO₂CH₃ | —(CH₂)₃—O—(CH₂)₄—OH | reddish orange |
| 317 | CH₃ | —SO₂C₂H₅ | ″ | ″ |
| 318 | CH₃ | —SO₂C₆H₅ | —(CH₂)₂—O—(CH₂)₂—OH | ″ |
| 319 | CH₃ | —SO₂CH₃ | —CH₂—CH₂—C₆H₅ | ″ |
| 320 | CH₃ | ″ | —(CH₂)₃—O—(CH₂)₂—O—C₆H₅ | ″ |
| 321 | H | ″ | —CH₂—CH₂—C₆H₅ | ″ |
| 322 | H | ″ | —(CH₂)₃—O—(CH₂)₂—O—C₆H₅ | ″ |
| 323 | H | —(CH₂)₃—O—(CH₂)₂—O—C₆H₅ | —SO₂H₃ | orange |
| 324 | CH₃ | ″ | ″ | ″ |
| 325 | CH₃ | —CH₂—CH₂—C₆H₅ | ″ | ″ |

We claim:
1. A dye of the formula

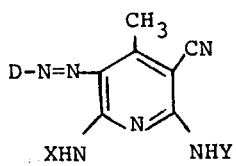

where

D is phenyl substituted by chlorine, bromine, methyl, methoxy, nitro, cyano, methylsulfonyl, ethylsulfonyl, phenylsulfonyl, carbalkoxy of a total of 2 to 5 carbon atoms, carbo-β-alkoxyethoxy, said alkoxy having 1 to 4 carbon atoms, or N,N-dialkyl-substituted sulfamoyl, said alkyl having 1 to 3 carbon atoms; phenylazophenyl; phenylazophenyl substituted by chlorine, bromine or nitro; benzthiazolyl; benzthiazolyl substituted by nitro, cyano, methylsulfonyl or ethylsulfonyl; benzisothiazolyl substituted by chlorine, bromine, cyano or nitro; thiazolyl substituted by cyano or nitro; thienyl substituted by methyl, cyano, nitro or carbalkoxy of a total of 2 to 5 carbon atoms; or thiadiazolyl substituted by phenyl, methyl, chlorine, bromine, methylmercapto, ethylmercapto or alkoxycarbonylethylmercapto, said alkoxy having 1 to 4 carbon atoms; and one of the radicals X and Y is alkanoyl of 1 to 8 carbon atoms, benzoyl; NC—CH₂CO—, ClCH₂CO—, H₅C₆CH₂CO—, H₅C₆OCH₂CO—, —SO₂CH₃, —SO₂C₂H₅ or SO₂C₆H₅ and the other hydrogen; alkyl of 1 to 6 carbon atoms; alkyl of 2 to 6 carbon atoms substituted by hydroxy, cyano, methoxy, ethoxy, phenoxy, phenoxyethoxy, benzyloxy or phenyl; cyclohexyl; norbornyl: phenyl; β-hydroxy-β-phenylethyl; or (CH₂)₃(OC₂H₄)ₙOR, R being alkyl of 1 to 4 carbon atoms or benzyl and n being the integer 1 or 2.

2. A dye as claimed in claim 1 of the formula

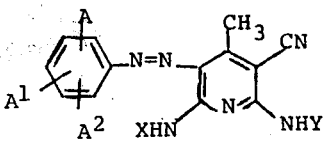

where

A is nitro, cyano, chloro, bromo, carbomethoxy, carbethoxy, β-methoxycarbethoxy, methylsulfonyl, ethylsulfonyl, methyl, methoxy or phenylazo; A¹ is hydrogen, nitro, chloro, bromo, cyano, methyl, methoxy, carbomethoxy, carbethoxy, methylsulfonyl or ethylsulfonyl; A² is hydrogen, chloro, bromo, cyano, methyl, methoxy, carbomethoxy or carbethoxy; and X and Y have the meanings given in claim 1.

* * * * *

UNITED STATES PATENT OFFICE
CERTIFICATE OF CORRECTION

Patent No. 3,950,321            Dated April 13, 1976

Inventor(s) Johannes Dehnert et al.

It is certified that error appears in the above-identified patent and that said Letters Patent are hereby corrected as shown below:

Front page, after [21] Appl. No.: 407,563, the next line should read:

"Foreign Application Priority Data

October 21, 1972   Germany   2251719"

Signed and Sealed this

Twenty-sixth Day of September 1978

[SEAL]

*Attest:*

RUTH C. MASON
*Attesting Officer*

DONALD W. BANNER
*Commissioner of Patents and Trademarks*